United States Patent [19]
Zappia

[11] Patent Number: 5,119,619
[45] Date of Patent: Jun. 9, 1992

[54] CARRIER FOR LEAF BLOWER/AIR RAKE

[76] Inventor: Michael L. Zappia, 14970 Sperry Rd., Novelty, Ohio 44072

[21] Appl. No.: 660,799

[22] Filed: Feb. 25, 1991

[51] Int. Cl.[5] .............................................. A01D 43/02
[52] U.S. Cl. ................................... 56/12.8; 56/16.7; 56/473.5; 56/DIG. 8; 15/340.2
[58] Field of Search ...................... 56/12.8, 16.7, 17.2, 56/473.5, 2, DIG. 3, DIG. 8, DIG. 9, DIG. 10; 15/340.1, 340.2, 327.3, 327.4, 327.5

[56] References Cited
U.S. PATENT DOCUMENTS 4,597,203 7/1986 Middleton ............................ 56/2 X
4,937,911 7/1990 Picchietti, Sr. et al. ...... 15/340.2 X Primary Examiner—Terry Lee Melius
Attorney, Agent, or Firm—J. Helen Slough

[57] ABSTRACT

A carrier for an air rake or leaf blower adjustably secured to a power driven vehicle or garden tractor, said carrier having roller means associated thereon wherefor the same may roll over the terrain, platform means for carrying an independently operable air rake or leaf blower thereon whereby the same is drawn over the terrain by the power driven vehicle and the leaf blower is operative while mounted thereon and may be disassociated therefrom for independent operation.

5 Claims, 2 Drawing Sheets

CARRIER FOR LEAF BLOWER/AIR RAKE

My invention relates to a carrier for Leaf Blowers and/or Air Rakes said carrier being adapted to be removably attached to a mobile unit such as a garden tractor or the like.

In the past portable vacuum cleaners have been employed as shown in U.S. Pat. No. 3,534,429 to collect leaves or other debris from lawns or other surfaces from mobile blower units operated by internal combustion means as shown in U.S. Pat. No. 4,118,826. An earlier patent to Fatton, U.S. Pat. No. 2,661,882, discloses a pair of blowers mounted on a tractor or the like which discharges an air blast to dislodge nuts or the like to clear ground surfaces. A U.S. Pat. No. to Cochrane 2,929,749 discloses means adapted to be towed by a tractor to blast air to the left of material and protect the same adjacent the side of a runway. A patent to Denton, U.S. Pat. No. 3,675,405 discloses a similar blower, having ramp means disposed in the air stream and comprising a grid to permit debris to pass therethrough.

SUMMARY OF THE INVENTION

This invention consists in a carrier adapted to be removably connected to a garden tractor or like vehicle, the carrier being adapted to be suspended on the wheels of a tractor or the like and to carry a leaf blower or, as it is termed, an "air rake", thereon. The leaf blower/air rake when operated on the carrier has its efficiency increased because of its carrier mounting on a power driven garden tractor or other vehicle and when so drawn about selected terrains by the tractor or the like blows or rakes the same clear of leaves etc., regardless of slope or bumps in the terrain. The carrier had backward and forward mobility and is provided with adjustable means for varying the height of the leaf blower or air rake. The carrier is provided with rollers and plate means at one end thereof which enables the carrier to ride over and roll on the garden, lawn surface or other terrain. The leaf blower while as shown mounted on the carrier, is adapted to be removed therefrom and to be independently operable.

Figure 1:
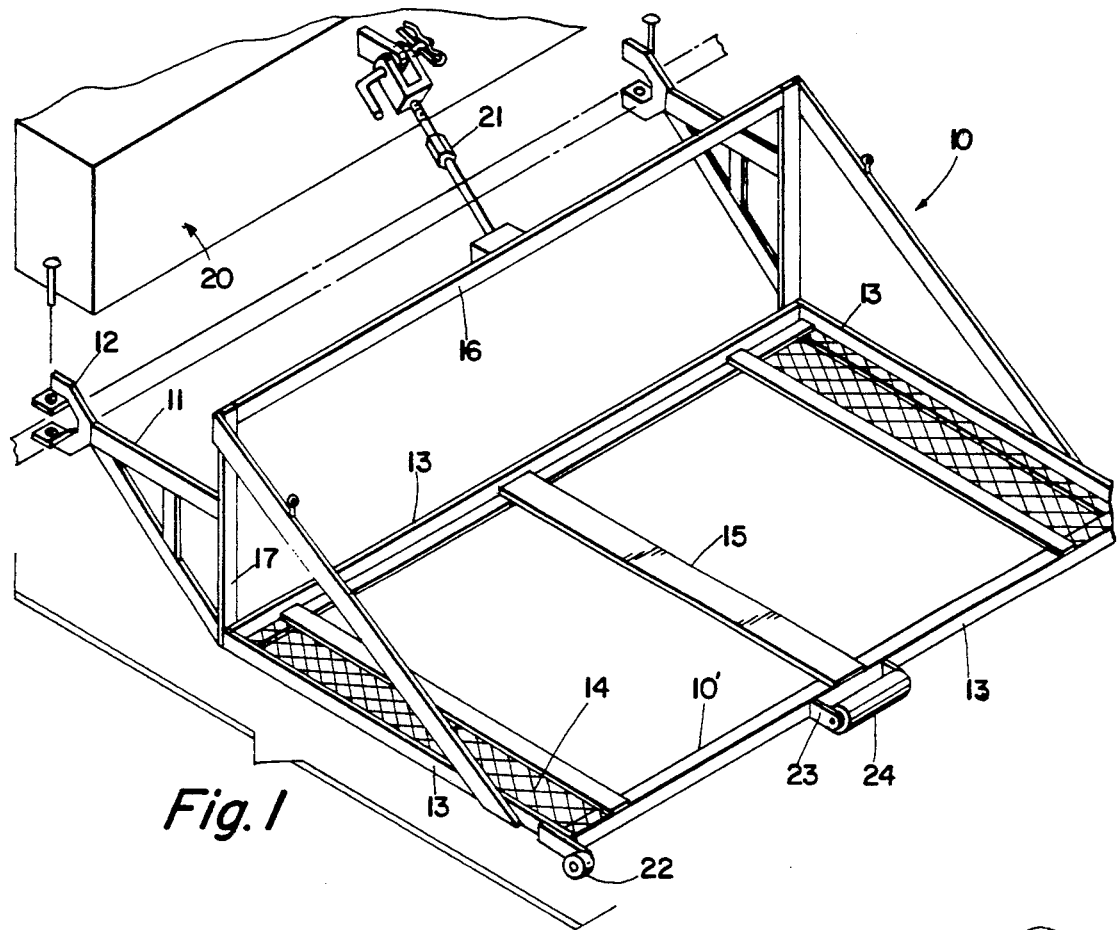
FIG. 1 is a perspective view of the Carrier of my invention showing attachment of the same to the rear of a garden tractor.
Figure 2:
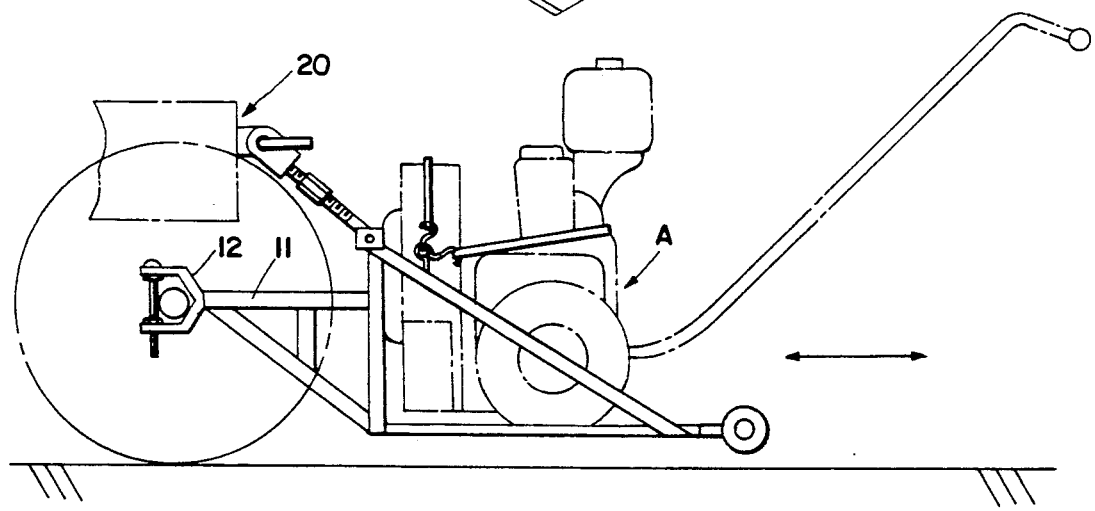
FIG. 2 is a side elevational view of the Carrier of my invention showing the same attached to the rear wheels of a garden tractor and carrying a leaf blower unit thereon.
Figure 3:
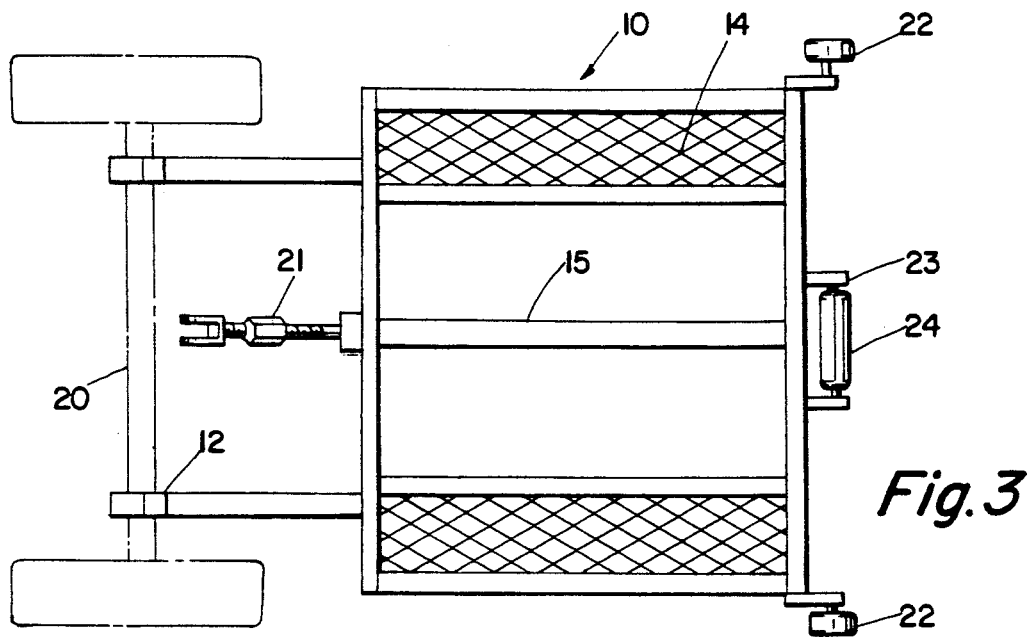
FIG. 3 is a top plan view of the Carrier of FIGS. 1 and 2.
Figure 4:
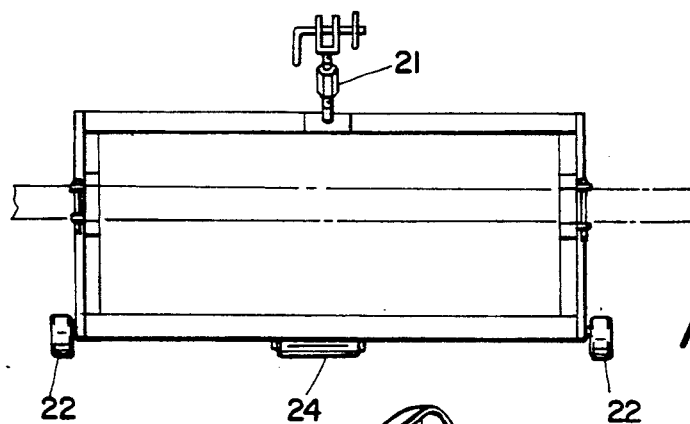
FIG. 4 is a rear view of the Carrier of FIG. 1.

Referring now to the drawings, in all of which like parts are designated by like reference characters, FIG. 1 discloses a preferred form of the carrier of the invention. The said carrier consists of a substantially rectangular metallic frame adapted to be, as shown, attached by C-shaped clamps 12 provided on triangular frame extensions 11 at either side of the forward ends of the frame, to the wheels of a garden tractor 20 as shown in FIG. 2. The rectangular carrier frame 10 comprises a platform 10' having upstanding flanges 13 surrounding the same. The platform is provided on either side with laterally extending longitudinally disposed lattice-shaped grid means 14 on which, as shown in FIG. 2, the wheels of an "Air Rake" or Leaf Blower are adapted to rest when an air rake or leaf blower positioned rearwardly of the frame is rolled upon the carrier platform 10'. As shown a longitudinally extending central reinforcing strap or bar 15 traverses the central portion of the frame. At the forward end of the frame the flanges 13 bordering the same provide the bottom rail of an upstanding stop portion to maintain the blower on the carrier. The said forwardly positioned flange is secured to the lowermost ends of vertically upstanding end posts 17 and a cross-beam 16 connects the upper ends of the posts 17.

Centrally of the cross-beam or bar 16 adjustable fastening means 21 are secured for adjustably connecting the leaf carrier, with an air rake or leaf blower mounted thereon, to a tractor or other vehicle wherefor the height of the carrier may be varied. Other means than those illustrated for securing the carrier to the vehicle and known in the art may be employed.

A pair of rollers 22 are mounted on the rear flange 13 of the carrier to enable the carrier to roll easily over rough terrain and an arcuate strip 23 having a roller 24 mounted therein, is in the preferred form of the invention, shown in FIGS. 1 to 4 inclusive, mounted centrally of the rear flange to assist in easy movement of the carrier over the ground, the arcuate strip being adapted to flex in movement.

As shown in FIG. 2 an air rake or leaf blower A is adapted to be rolled onto the carrier platform and may be strapped or otherwise fastened thereon and may be readily rolled off for independent operation thereof.

Figure 5:
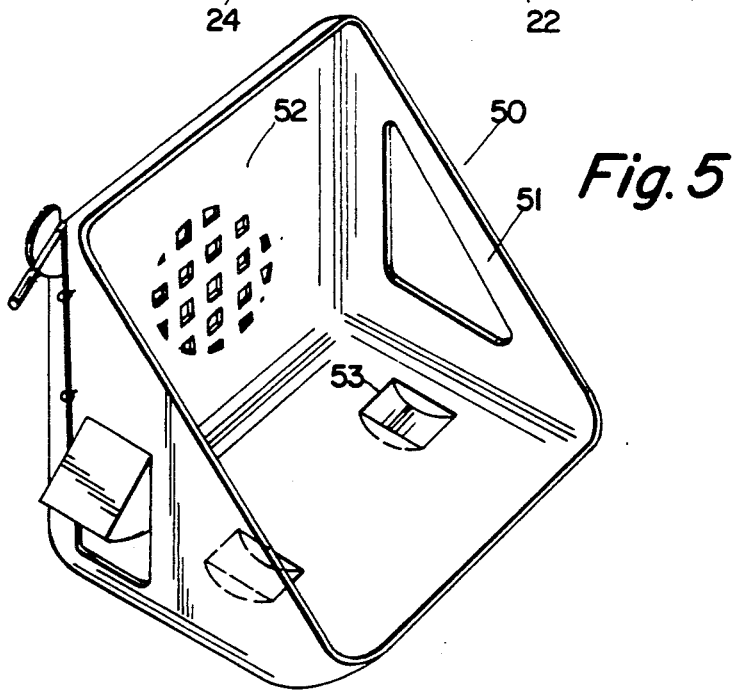
FIG. 5 is a rear view of a modification of the Carrier of FIGS. 1 to 4 inclusive.

In FIG. 5 a different embodiment of carrier is shown at 50 and the same is basket or bucket shaped as shown, being formed of metallic material and having apertured upstanding sides 51 and a forward stop 52 formed perpendicularly to the bottom thereof, which bottom is relatively flat and formed with depressions 53 therein to seat the wheels of the air rake or leaf blower.

While I have described the invention in connection with preferred embodiments, I am aware that numerous and extensive departures may be made therein without however departing from the spirit of my invention and the scope of the appended claims.

What I claim is:

1. A carrier for a leaf blower or air rake, said carrier being adapted to be mounted on the rear of a wheeled garden tractor or like vehicle, the carrier comprising a metal framework having a platform surrounded by upstanding flanges, said platform being substantially rectangular in form and provided with horizontally extending grids on either side thereof to seat the wheels of a leaf blower or air rake thereon, means for removably mounting and securing the forward end of the platform to a garden tractor or like vehicle and roller means secured to the rear end of the platform to permit the carrier with a blower or air rake mounted thereon to roll over existing terrain.

2. A carrier as claimed in claim 1 wherein stop means are provided forwardly of the platform to prevent the blower or air rake from undue forward movement.

3. A carrier as claimed in claim 1 wherein the means for securing the carrier to the vehicle are adjustable.

4. A carrier as claimed in claim 1 wherein the carrier is adapted to be suspended on the wheels of the vehicle.

5. A carrier as claimed in claim 1 wherein the blower or air rake can be operated independently of the vehicle.

* * * * *